United States Patent
Bolis

(10) Patent No.: US 8,116,011 B2
(45) Date of Patent: Feb. 14, 2012

(54) MEMBRANE DEFORMABLE OPTICAL DEVICE HAVING IMPROVED ACTUATION

(75) Inventor: Sébastien Bolis, Crolles (FR)

(73) Assignee: Commissariat a l'Energie Atomique, Paris (FR)

( * ) Notice: Subject to any disclaimer, the term of this patent is extended or adjusted under 35 U.S.C. 154(b) by 130 days.

(21) Appl. No.: 12/610,719

(22) Filed: Nov. 2, 2009

(65) Prior Publication Data

US 2010/0118414 A1   May 13, 2010

(30) Foreign Application Priority Data

Nov. 7, 2008   (FR) ..................................... 08 57574

(51) Int. Cl.
*G02B 1/06* (2006.01)
(52) U.S. Cl. ........................................ 359/666; 359/665
(58) Field of Classification Search ........... 359/665–667
See application file for complete search history.

(56) References Cited

U.S. PATENT DOCUMENTS

| | | | |
|---|---|---|---|
| 5,138,494 A | 8/1992 | Kurtin | |
| 5,917,657 A | 6/1999 | Kaneko et al. | |
| 6,344,930 B1 | 2/2002 | Kaneko et al. | |
| 2007/0030573 A1 | 2/2007 | Batchko et al. | |
| 2009/0147371 A1* | 6/2009 | Lee et al. | 359/665 |
| 2009/0180198 A1* | 7/2009 | Lee et al. | 359/666 |
| 2010/0165475 A1* | 7/2010 | Lee et al. | 359/666 |
| 2010/0195213 A1* | 8/2010 | Bolis | 359/666 |

FOREIGN PATENT DOCUMENTS

| | | |
|---|---|---|
| FR | 2912 514 | 8/2008 |
| GB | 2 448 238 A | 10/2008 |
| JP | 60-220301 | 11/1985 |
| JP | 1-166003 | 6/1989 |
| JP | 8-114703 | 5/1996 |
| JP | 10-144975 | 5/1998 |
| JP | 2002-243918 | 8/2002 |
| WO | WO 03/102636 A1 | 12/2003 |
| WO | WO 2009/130171 A1 | 10/2009 |

OTHER PUBLICATIONS

S. Kuiper, et al., "Variable-focus liquid lens for miniature cameras" Applied Physics Letters, vol. 85, No. 7, XP012064218, Aug. 16, 2004, pp. 1128-1130.

* cited by examiner

*Primary Examiner* — Jordan Schwartz
(74) *Attorney, Agent, or Firm* — Oblon, Spivak, McClelland, Maier & Neustadt, L.L.P.

(57) ABSTRACT

An optical device including: at least one deformable membrane; a first support; and actuating unit for loading the membrane to deform it, the membrane being provided with a anchoring zone for anchoring to the support which surrounds a part of the membrane including a substantially central zone that is reversibly deformable, the support and the membrane contributing to imprison a constant volume of a first fluid in contact with a face of part of the membrane, wherein the actuating unit includes control-activated main actuating unit for loading the membrane in a peripheral zone and control-activated supplementary actuating unit anchored at least to the membrane for loading the membrane in the central zone.

18 Claims, 7 Drawing Sheets

MEMBRANE DEFORMABLE OPTICAL DEVICE HAVING IMPROVED ACTUATION

TECHNICAL FIELD

The present invention relates to a membrane deformable optical device enclosing a fluid and provided with membrane actuating means such as a variable focal length lens, an optical aberration correction lens in adaptive optics, or even a membrane deformable mirror.

Liquid lenses are useful for example in mobile telephones having a still or video camera function. Many developments are under way, including in particular the autofocus function and the zoom function. During the introduction of these functions, an attempt is made to obtain the shortest possible response time. More generally, an attempt is made to integrate the maximum possible components of these miniature cameras to reduce the costs, size and power consumption. These miniature cameras, operating in the visible, are known as compact camera modules (CCM). They are commonly provided with lenses consisting of one or two liquids to which a voltage is applied to change their wettability.

Another application relates to cameras operating in the infrared (IR). Progress in terms of integration is less, and in most cases, the optics are dissociated from the cameras. Several developments are under way, including in particular the integration of the optics (creation of a camera module), the integration of the autofocus function. For the time being, the associated technical solutions are not known and need definition.

In a membrane deformable mirror application, the mirror is reflecting. In this application, the fluid may be a gas. It may be required to adjust the focal length of the mirror and hence its radius of curvature. Such a mirror can be used in opthalmology or in adaptive optics.

PRIOR ART

Variable focal length optical devices such as variable focal length liquid lenses consisting of a liquid operating at constant volume between two walls, of which at least one is mobile, have been the subject of several patents, for example: U.S. Pat. No. 5,917,657, U.S. Pat. No. 6,344,930, JP-A-10-144975, JP-A-08-114 703, U.S. Pat. No. 5,138,494, WO 2003/102636, JP2002-243918 and JP-A-60 220301.

The mechanical structures associated with the membranes are all highly complex, and are too expensive for an application in compact camera modules like those integrated in camera-telephones.

FIGS. 8A, 8B show two examples of variable focal length liquid lenses, described in U.S. Pat. No. 5,917,657. These lenses are selected because they illustrate the least complex lenses in terms of actuation.

The liquid lens 1000 in FIG. 8A consists of a central first transparent elastic film 106a, a central second transparent elastic film 106b, a peripheral elastic film 104 and a peripheral container 105. The first and second transparent elastic films 106a, 106b are placed facing each other. The peripheral elastic film 104 is fixed around the first transparent elastic film 106a and the combination forms a first membrane 2. The first membrane is anchored to one face of the peripheral container 105. The second membrane consists of the second elastic film. It is anchored to another face of the peripheral container. All these elements are hermetically sealed to one another and contain a liquid 103. The actuating means of the lens 102, whose function is to apply a pressure to the liquid 103, act on the peripheral plastic film 104. They are formed from a plurality of actuators 201 arranged in a ring-shaped container 203. This container is relatively thick. Their action takes place on the membrane via a ring added to the peripheral elastic film 104. The two containers 105, 203 are joined face to face. The transparent elastic films only have an optical role and the peripheral elastic film only has a mechanical role.

These liquid lenses 1000 have the drawbacks listed below.

One major drawback is associated with the type of actuation, which is bulky and complex, in particular because of the container, and not highly effective.

Methods for manufacturing these lenses are unitary and multidisciplinary. These methods include plastic processing techniques for preparing and shaping films, injection and machining techniques for producing the containers. The methods for hermetically joining the film to the container differ according to the type of seal (plastic-plastic, plastic-glass, plastic-metal). Moreover, the seals to be obtained are not all located in the same plane, thus requiring delicate handling of films or plates, which considerably complicates the method employed and the tooling required. These techniques are not compatible with conventional methods for manufacturing batches employed for the production of microelectromechanical systems MEMS or micro optoelectromechanical systems MOEMS. Their cost consequently remains high and their size also.

Moreover, during the assembly, it is difficult to position the transparent elastic film at the peripheral elastic film and to position the ring perfectly during its transfer to the peripheral elastic film. Another difficulty is the perfect positioning of the actuators with regard to the ring. An imperfect positioning gives rise to optical aberrations, which degrade the quality of the image obtained.

Furthermore, it is necessary for the peripheral elastic film that is to be moved by the actuating means, both at rest and in operation, to be as parallel as possible to the surface of the peripheral container at the anchorage. If not, optical aberrations are produced and degrade the quality of the image obtained. In fact, FIG. 8B shows a cross section of the liquid lens described in U.S. Pat. No. 5,917,657 with the exception of the actuating means. To avoid any risk of optical aberration, the main planes in which the membrane portions extend at the anchorage to the container and the seal between the various films constituting the membrane must be substantially parallel. It is very difficult to achieve these results with the many seals required.

Furthermore, since several films are sealed together hermetically, like a patchwork, and to the container for encapsulating the liquid, the risk of leakage is not negligible.

Another drawback is associated with the electric power consumption of the actuating means on the one hand, when they actuate the membrane, but also when they maintain the membrane in a given position. Attempts are obviously made to minimize the power consumption in mobile telephone applications.

SUMMARY OF THE INVENTION

It is precisely the object of the present invention to provide a membrane deformable optical device such as at least a liquid lens or mirror which does not have the abovementioned drawbacks, that is the complexity of the actuating means and their size, the optical aberrations, the high risk of leakage, the incompatibility with the microelectronic environment, and the unfeasibility of batch manufacture.

It is a further object of the invention of the invention to increase the effectiveness of the actuating means to deform the membrane so as to obtain a greater deformation of the membrane than could be obtained in the prior art.

A further object of the invention is to reduce the electric power consumption of the optical device both during the actuation of the actuating means and when they are static and maintain the membrane in a deformed position.

To achieve this purpose, the present invention is an optical device comprising at least one deformable membrane, a support, actuating means for loading the membrane to deform it, the membrane being provided with a zone for anchoring to the support and a substantially central zone suitable for deforming reversibly surrounded by an anchoring zone, the support and the membrane contributing to imprison a constant volume located at least in the interior of the anchoring zone of a fluid called first fluid, in contact with one of the faces of the membrane. The membrane actuating means comprise main actuating means which load the membrane in a peripheral zone lying between the central zone and the anchoring zone in order to move it in a direction and to move the first fluid towards the central zone and supplementary actuating means anchored at least to the membrane which load the membrane in the central zone to move it in the reverse direction.

The optical device preferably comprises a cover opposite the membrane to protect it.

The main actuating means may be formed from at least one electrostatic, piezoelectric, thermal bimorph, magnetic actuator.

When the main actuating means comprise at least one electrostatic actuator, this electrostatic actuator comprises two electrodes facing one another separated by a dielectric with a fixed electrode at the support and a mobile electrode at the membrane.

The supplementary actuating means preferably comprise at least one electrostatic actuator formed from two electrodes facing one another separated by a dielectric with a mobile electrode at the membrane and a fixed electrode at another support such as a cover for protecting the membrane fixed to the support.

The supplementary actuating means may comprise a plurality of electrostatic actuators, the fixed electrodes and/or the mobile electrodes of the actuators are arranged concentrically about an optical axis of the optical device.

A fixed electrode or a mobile electrode may be common to a plurality of actuators belonging to the main actuating means and/or to the supplementary actuating means.

A mobile electrode of the main actuating means and/or of the supplementary actuating means may be located on one of the faces of the membrane, is sandwiched between two sublayers of the membrane or is formed by the membrane itself.

A mobile electrode of the main actuating means and a mobile electrode of the supplementary actuating means may be merged.

A mobile electrode of the main actuating means and a mobile electrode of the supplementary actuating means may be electrically connected by at least one electrically conductive extension.

The membrane may be produced based on organic materials such polydimethylsiloxane, methyl polymethacrylate, polyethylene terephthalate, polycarbonate, parylene, epoxy resins or silicones, or inorganic materials such as silicon, silicon dioxide, silicon nitride, silicon carbide, polycrystalline silicon, titanium nitride, diamond carbon, tin and indium oxide, aluminium.

The cover may be produced based on glass or organic material such as polyethylene terephthalate, polyethylene naphthalate, methyl polymethacrylate, polycarbonate.

The cover bounds a cavity which is filled with a second fluid.

The supplementary actuating means may comprise a portion located outside the volume of the first fluid.

The supplementary actuating means may, as an alternative, be piezoelectric.

The optical device may comprise means for servocontrolling a voltage to be applied to the main actuating means according to the thickness of the first fluid in the neighbourhood of the main actuating means and/or means for servocontrolling a voltage to be applied to the supplementary actuating means according to the thickness of the second fluid in the neighbourhood of the supplementary actuating means.

The second fluid is imprisoned in the cavity or is free to leave the cavity.

In the case in which the optical device comprises a plurality of membranes, a single cover may protect the membranes.

In the optical device according to the invention, the cover may carry a fixed electrode common to a plurality of supplementary actuating means each loading a different membrane.

The optical device may operate in transmission or in reflection.

When it operates in transmission, the second fluid preferably has an absolute refractive index different from that of the first fluid, this absolute index being in particular lower than that of the first fluid when the optical device is convergent or being higher when the optical device is divergent.

If the second fluid has an absolute index higher than that of the first fluid for the same diopter shape, then for this same diopter shape, the optical device becomes divergent. In the case of an optical device operating in reflection, the two fluids are selected independently of one another and according to the desired characteristics.

To prevent the degradation of the optical performance of the optical device due to the effects of gravity, it is preferable for the second fluid to have a density as close as possible to that of the first fluid regardless of whether the operating mode is in transmission or in reflexion.

The main actuating means and the supplementary actuating means are activable in succession or simultaneously, and optionally offset.

The present invention also relates to a viewing device comprising at least one optical device thus characterized.

BRIEF DESCRIPTION OF THE DRAWINGS

The present invention will be better understood from a reading of the description of exemplary embodiments, provided exclusively for information and non-limiting, with reference to the appended drawings in which.

The identical, similar or equivalent parts of the various figures described below bear the same numerical references in order to facilitate the passage from one figure to the next.

The various parts shown in the figures are not necessarily to a uniform scale, to make the figures more legible.

DETAILED SUMMARY OF PARTICULAR EMBODIMENTS

Figure 1:
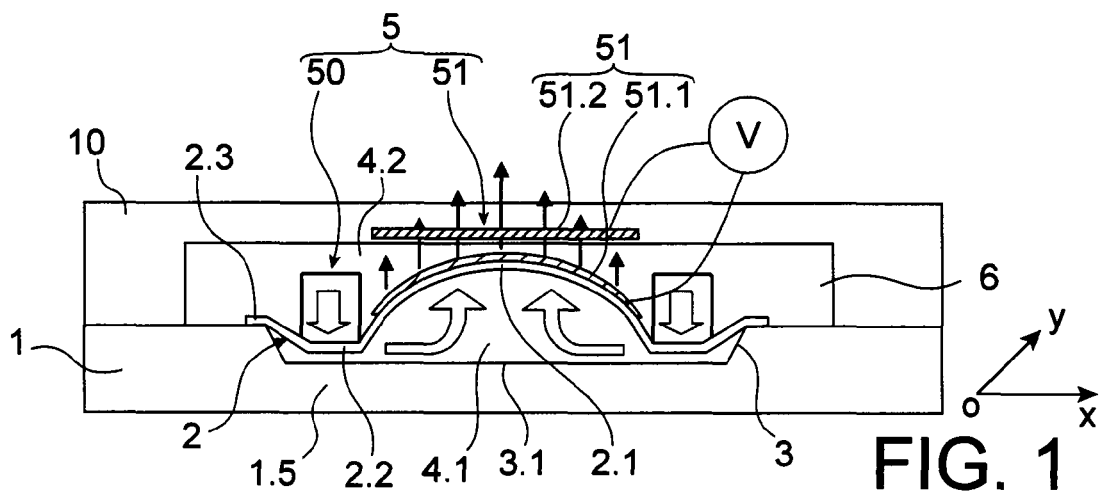
FIG. 1 shows a cross section of an optical device according to the invention.

Reference should now be made to FIG. 1 which shows an optical device of the invention. It comprises at least one deformable membrane 2 of which the edge is anchored to a support 1.5.

The zone of the membrane 2 anchored to the support 1.5 is called anchoring zone and has the reference 2.3. In this example, the anchorage is made at the frame 1 of the support 1.5. The frame 1 contributes to bound a bowl 3 shaped in the support 1.5 and bordering it. The bowl 3 is intended to contain a constant volume of fluid 4.1 called first fluid located at least in the interior of the anchoring zone 2.3. If this first fluid is a gas, a slight compression of the gas may be allowed. The maximum permissible compression threshold corresponds to a value above which the substantially central zone 2.1 of the membrane is no longer deformed. It may obviously concern a liquid.

One of the faces of the membrane 2 is immersed in the first fluid 4.1. The support 1.5 extends along a main plane xoy. The bowl 3 has a bottom 3.1. When the optical device operates in transmission, an optical beam (not shown) passes through the membrane 2, in the substantially central zone 2.1 also called optical field, the first fluid 4.1 and the support 3.1 at the bottom of the bowl 3. Subsequently, for simplification, the expression central zone is used. The anchoring zone 2.3 surrounds the central zone 2.1 of the membrane 2. The frame 1 and the bowl 3 are not necessary, since the substrate 1.5 may be a substantially planar substrate. The bottom 3.1 is transparent for the optical beam used. The membrane 2 has a face in contact with the first fluid 4.1. If the optical device operates in reflection, at least one of the faces of the membrane 2 is reflecting for the optical beam. During the use of the optical device according to the invention in reflection, the reflection may take place at the face of the membrane on the side of the first fluid 4.1, at the other face of the membrane, or at both faces. The support 1.5 and the membrane 2 contribute to imprison a constant volume, located at least in the interior of the anchoring zone 2.3 of the first fluid 4.1.

In the example in FIG. 1, the membrane 2 is placed in a cavity 6 bounded by a cover 10 which is sealed to the support 1.5. This attachment can be made for example by molecular bonding, by organic bonding, by anodic bonding, by eutectic bonding an alloy layer for example made of Au/Si or Au/Sn for example being inserted between the cover 10 and the support 1.5 to be sealed. These bonding techniques are commonly used in the field of microelectronics and microsystems. The cover 10 is opposite the membrane 2.

The cavity 6 is filled with a second fluid 4.2, the other face of the membrane 2 being in contact with the second fluid 4.2. The cover 10, at least in its central part, and the second fluid 4.2 must be transparent for the incident optical beam which is either reflected on the membrane 2, or passes through it according to the type of optical device concerned.

The cover 10 may be produced from glass or an organic material such as polyethylene terephthalate PET, polyethylene naphthalate, polymethyl methacrylate PMMA, polycarbonate PC if it has to transmit wavelengths in the visible. The cover 10 provides protection of the membrane 2 because such optical devices having a deformable membrane 2 are fragile objects that must be handled with care.

Figure 5A:
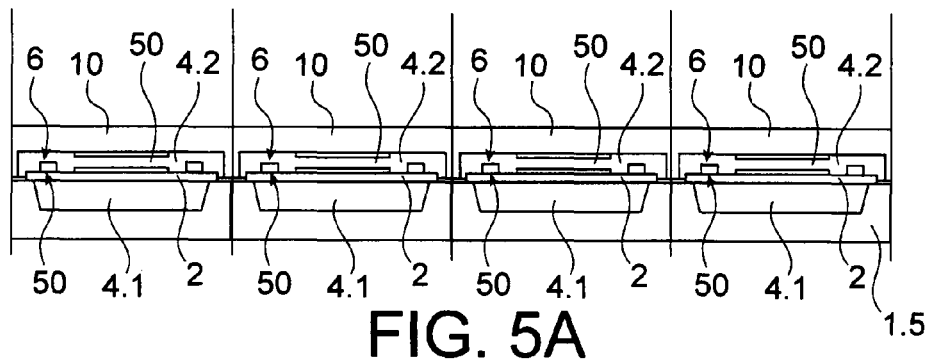
FIGS. 5A, 5B show alternatives of the optical device according to the invention having a plurality of membranes.

The optical device may be produced by techniques known in batch manufacturing microelectronics and all the covers 10 of the various devices may be produced collectively as shown in FIG. 5A described below.

In the context of the present invention, membrane 2 means any flexible film acting as a barrier between the first fluid 4.1 and second fluid 4.2 lying on the other side of the barrier with regard to the first fluid 4.1. This second fluid 4.2 may simply be air or another gas or even a liquid.

Figure 2A:
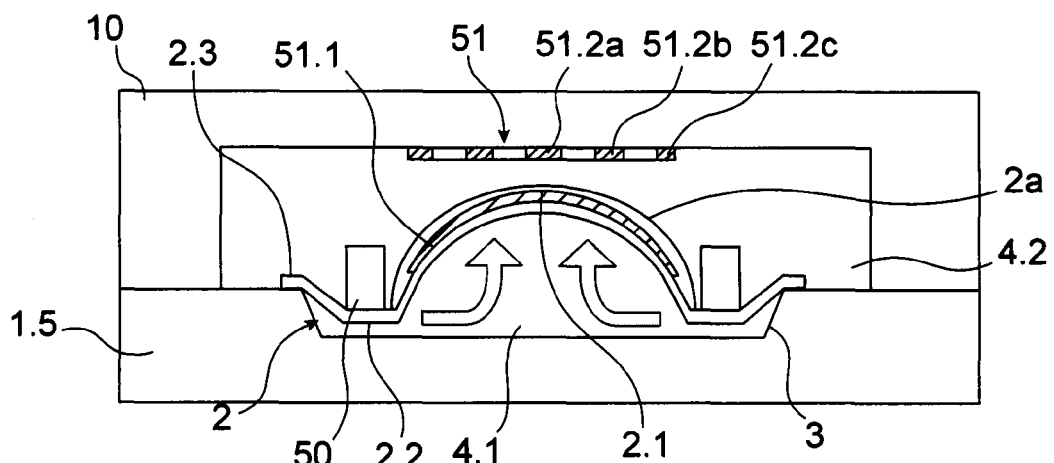
FIGS. 2A, 2B show a cross section and plan view of an alternative of an optical device according to the invention, where the supplementary actuating means comprise concentric fixed electrodes.

The membrane 2 is formed from at least one layer which is continuous from the central zone 2.1 to the anchoring zone 2.3. It may be a single layer or multilayer, and if it is multilayer, it may be only locally multilayer. It may be multilayer in the peripheral zone 2.2 and not in the central zone 2.1 for example as shown in FIG. 2A.

The membrane 2 may be produced based on organic materials such as polydimethylsiloxane, methyl polymethacrylate, polyethylene terephthalate, polycarbonate, parylene, epoxy resins or silicones, or inorganic materials such as silicon, silicon dioxide, silicon nitride, silicon carbide, polycrystalline silicon, titanium nitride, diamond carbon, tin and indium oxide, aluminium. It may thus be electrically conductive or on the contrary dielectric.

In order to vary the focal length of the optical device, actuating means 5 are provided. They are formed from main actuating means 50 which act on the membrane 2 in a peripheral zone 2.2 of the membrane 2 located between the anchoring zone 2.3 and the central zone 2.1 and supplementary actuating means 51 which act on the membrane 2 in the central zone 2.1, the two actuating means 50, 51 acting on the membrane 2 in the reverse direction, that is they apply forces in opposite directions to the membrane. The main actuating means 50 load the membrane 2 in the peripheral zone 2.2 in such a way that the first fluid 4.1 is expelled towards the central zone 2.1 of the membrane 2 in order to deform it. In FIG. 1, the main actuating means 50 push the membrane 2 towards the bowl 3, or more generally, closer to the support 1.5. The arrows in the first fluid 4.1 show the movement of the first fluid 4.1 during the activation of the actuating means 50.

Conversely, the supplementary actuating means 51 draw the membrane 2 away from the support 1.5 and closer to the cover 10. The supplementary actuating means 51 therefore amplify the deformation of the membrane 2 obtained by the main actuating means 50 in the central zone 2.1. The supplementary actuating means 51 must not counteract the action of the main actuating means 50 but on the contrary, supplement it or amplify it.

The supplementary actuating means 51 by cooperating with the main actuating means 50, make it possible, for a given voltage applied to the main actuating means 50, to amplify the deformation of the membrane 2. For a given deformation of the membrane 2, the supplementary actuating means 51, by cooperating with the main actuating means 50, serve to decrease the voltage to be applied to the main actuating means.

Figure 3A:
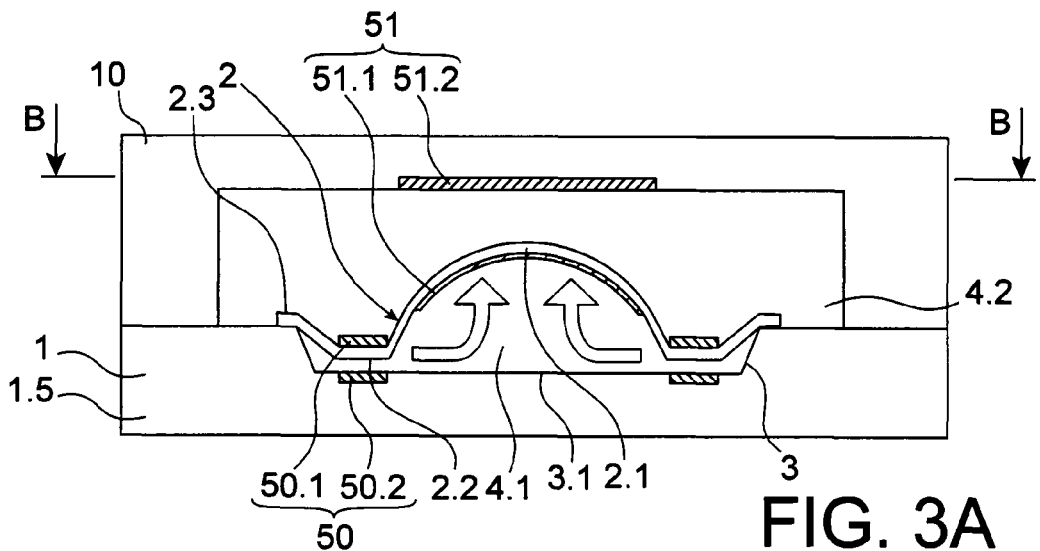
FIGS. 3A to 3G show miscellaneous variants of an optical device according to the invention.
Figure 3B:
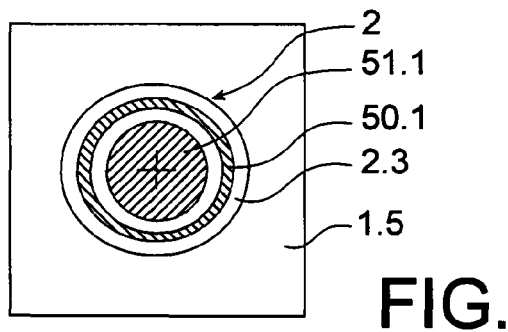

The main actuating means 50 may be formed from at least one electrostatic, piezoelectric actuator, in particular formed from ferroelectric ceramic PZT ($PbZrTiO_3$) in a thin layer, of the thermal bimorph type, of the magnetic type or other. In FIGS. 1, 2A, the main actuating means 50 are only shown schematically, without their nature being indicated, whereas in FIGS. 3A, 3B, they are shown by at least one electrostatic actuator. They comprise at least one pair or electrodes 50.1, 50.2 facing one another, separated by dielectric, one being mobile and located at the membrane 2 and the other being fixed and located at the support 1.5. The dielectric serves to prevent a short-circuit between the two electrodes of an actuator. The two electrodes 50.1, 50.2 of the pair are intended to be brought to a potential difference during the actuation, in order to attract each other. In FIGS. 3A, 3B, there is only a single actuator for the main actuating means 50. It has a ring-shaped mobile electrode 50.1 located on the membrane 2 opposite the first fluid 4.1 and a fixed electrode 50.2, also ring-shaped, located in the support 1.5 at the bottom 3.1 of the bowl 3. This fixed electrode 50.2 is in contact with the first fluid 4.1. It is assumed that the membrane 2 is made from a dielectric material on the first fluid 4.1 side. Each actuator may only load a part, called the loaded part, of the peripheral zone 2.2. In the case of a plurality of actuators, it may be preferable to distribute the various actuators substantially uniformly around the membrane 2.

The supplementary actuating means 51 are preferably electrostatic. They may comprise one or more actuators, each formed of a pair of electrodes 51.1, 51.2, facing one another, separated by dielectric, one of the electrodes of the pair being mobile and the other being located at the membrane 2 and the other being fixed and being located at a second support placed opposite the first support 1.5 with regard to the membrane 2. In the example in FIG. 1, the second support is represented by the cover 10. Other supports are feasible.

In FIGS. 3A, 3B, the supplementary actuating means 51 only comprise a single actuator having substantially circular and opposing electrodes, a mobile electrode 51.1 located at the membrane 2 being on the side of the first fluid 4.1. FIG. 3B is a plan view of the optical device with the cover removed, the mobile electrode 51.1 of the supplementary actuating means 51 being seen by transparence. The mobile electrode 50.1 of the main actuating means 50 and the mobile electrode 51.1 of the supplementary actuating means 51 are substantially concentric, centred on the optical axis of the optical device. The optical axis is shown by the cross.

Figure 3C:
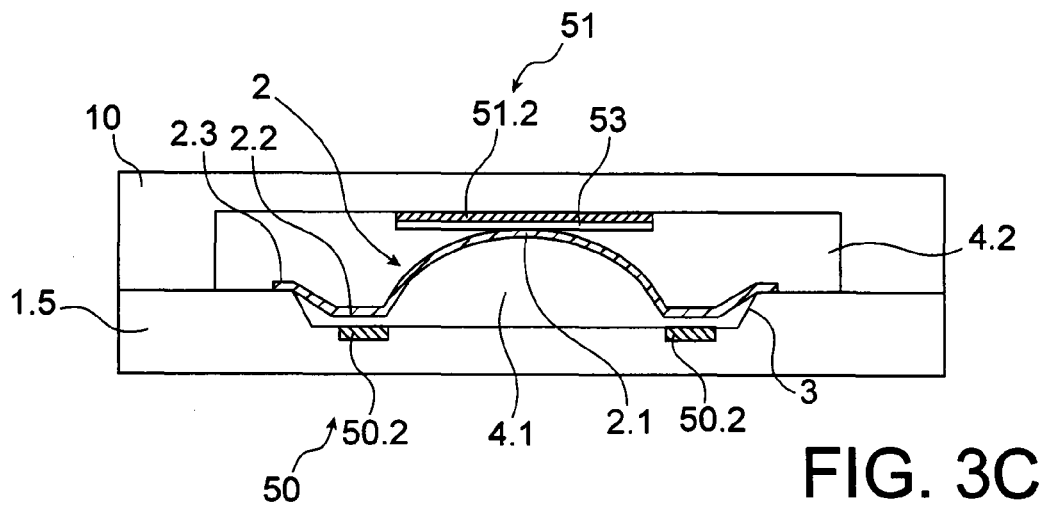

A mobile electrode 50.1, 51.1 located at the membrane 2, whether it belongs to an actuator of the main actuating means 50 or to an actuator of the supplementary actuating means 51 may be located on one face of the membrane 2, on the other face of the membrane 2, be embedded in the membrane 2 in the case in which the membrane 2 is multilayer or even be formed by the membrane 2 itself, in the case in which the membrane 2 is electrically conductive, made from aluminium for example. The latter configuration is shown in FIG. 3C. A layer of dielectric material 53 covers the fixed electrode 51.2 of the supplementary actuating means 51. In this case, the second fluid 4.2 may not be dielectric.

In a pair or electrodes of the supplementary actuating means 51, the fixed electrode 51.2 is located at the inside surface of an apical wall of the cover 10.

Figure 2B:
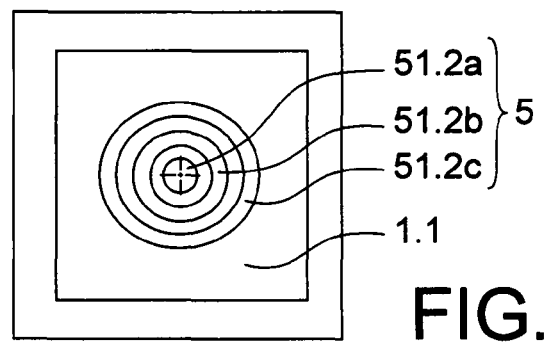

In the case of a plurality of actuators and hence several pairs of electrodes, it is possible that each has an electrode specific to it on one side and that it shares an electrode with one or more actuators on the other side. Thus, an electrode, whether mobile on the membrane 2 or fixed to the support 10 or 1.5, may form part of several actuators. This feature obviously applies both to the main actuating means 50 and the supplementary actuating means 51. Reference can be made to FIGS. 2A, 2B, showing a plurality of actuators in the supplementary actuating means 51. These actuators share the same mobile electrode 51.1. On the contrary, they each have a fixed electrode specific to them, the fixed electrodes having the references 51.2a, 51.2b, 51.2c.

In the case of a plurality of actuators and hence several pairs of electrodes in the supplementary actuating means 51, it is preferable for the neighbouring electrodes of different actuators to be arranged substantially concentrically. One of them may have a disc shape and one or more rings concentric with one another and with the disc and having different sizes. This configuration is shown in FIGS. 2A, 2B. The electrodes fixed to the cover 10 are multiple, and on the membrane 2 there is only a single substantially circular mobile electrode 51.1 of which the radius is at least equal to the largest radius of the mobile electrode farthest from the circular electrode 51.2c, so that each electrode of a pair is opposite an electrode of the same pair. The reverse could be feasible. In the example in FIGS. 2A, 2B, the electrodes are preferably centred on the optical axis about which the optical device is constructed. It is obviously possible to reverse the electrodes and place the plurality of electrodes on the membrane 2 and the single electrode on the cover 10.

In the case of a plurality of actuators for the supplementary actuating means 51, they load the membrane 2 at the loaded parts included in the central zone 2.1. In FIG. 2B, the loaded parts correspond to the overlapping surfaces between the two electrodes of an actuator.

In FIG. 2A, the mobile electrode 51.1 of the supplementary actuating means is sandwiched between two sub-layers 2a, 2b of the membrane 2. In the example in FIG. 2A, the sub-layer 2b extends continuously to the anchoring zone 2.3. The other sub-layer 2a occupies the central zone 2.1 but does not reach the peripheral zone 2.2. It is conceivable that the mobile electrode 50.1 of this main actuating means 50 is exactly sandwiched between two sub-layers of the membrane 2.

When the actuating means 50, 51 whether main or supplementary, comprise a plurality of actuators, they may be located so as to satisfy a circular symmetry. They may be actuated independently from one another, so that forces having different amplitudes are applied to the membrane 2 or forces apply at certain places and not at others.

It is thus possible to smooth any imperfections appearing in the diopter formed by the membrane 2 and the most axisymmetrical form possible is preferred. On the contrary, in the case in which the optical device is intended for adaptive optics, localized deformations are generated, reverse to those of an incident wavefront. The distribution of the actuators may then not satisfy the circular symmetry. Many configurations are feasible for the actuators of the main actuating means 50 and for the supplementary actuating means 51 without the need to go into the matter in greater detail.

It is obviously possible to actuate the actuators of the main actuating means together. The same applies for the actuators of the supplementary actuating means 51.

The actuators of the supplementary actuating means 51 are located in the optical field of the optical device and the electrodes 51.1, 51.2 must be as transparent as possible for the incident optical beam that will pass through them. For the visible, they may be prepared from indium tin oxide known as ITO, this material having suitable optical and electrical properties.

To limit the optical impact of the various electrodes 51.1, 51.2, a dielectric having substantially the same refractive index as the electrodes themselves may be deposited on one and/or the other electrode of an actuator of the supplementary actuating means 51.

The dielectric material that has to separate the two electrodes of an actuator may be deposited on the fixed electrode 51.2 which is supported by the cover 10 as shown in FIG. 3C, bearing the reference 53.

The mobile electrode 51.1 at the membrane 2 may also be covered with dielectric material, it may be located under the membrane 2 on the side of the first fluid 4.1 if the membrane 2 is made for a dielectric material as shown in FIG. 3A.

It may be sandwiched between two sub-layers 2a, 2b of the membrane 2 as in FIG. 2A. The sub-layer 2b of the membrane 2 is located on the side of the cover 10 and acts as a dielectric in the central zone 2.1. It may also be located on the membrane 2 on the side of the cover 10 and may or may not be covered with dielectric material as shown in FIG. 1.

Figure 4A:
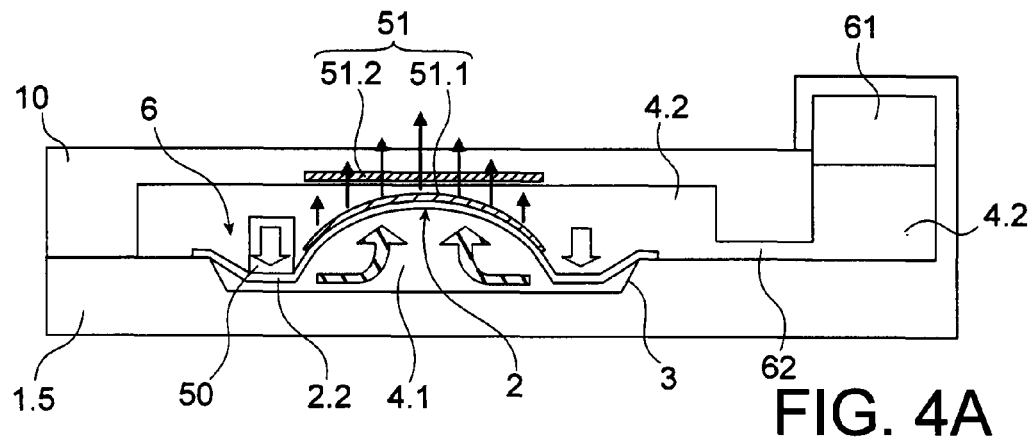
FIGS. 4A, 4B show the displacement of the first fluid in which the second fluid is free and in the case in which it is imprisoned.
Figure 4B:
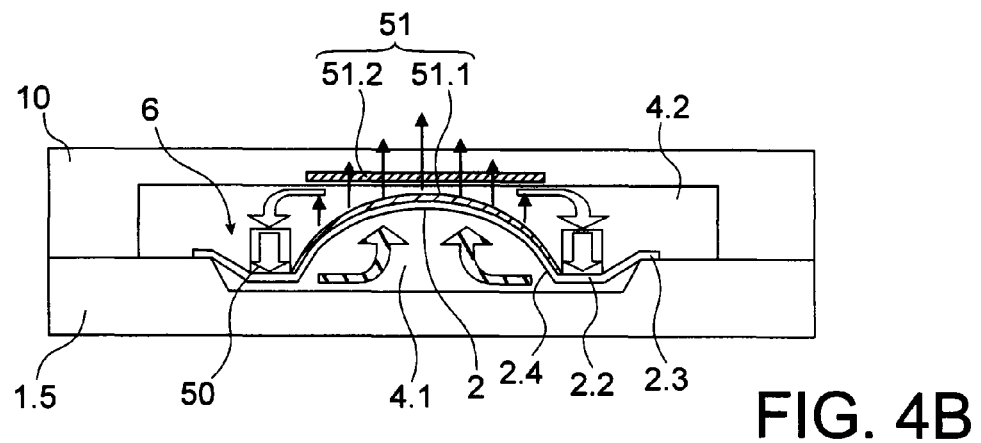

In the case in which the mobile electrode 51.1 is added on to the membrane 2 in the central zone 2.1, it may have a link with a component sub-layer of the membrane 2 in the zone of the membrane 2 other than the central zone 2.1. For example, the mobile electrode 51.1 may overflow the central zone 2.1 and cover an intermediate zone 2.4 of the membrane 2 located between the central zone 2.1 and the peripheral zone 2.2 as shown in FIG. 4B.

As an alternative, at least one mobile electrode 51.1 which is located on the membrane 2 and which belongs to the supplementary actuating means 51 may have an electrical link with at least one mobile electrode 50.1 of the main actuating means 50. In FIG. 3C, it is the membrane 2 itself that acts as a mobile electrode both for the main actuating means 50 and for the supplementary actuating means 51. The membrane 2 comprises a conductive layer which extends continuously from the central zone 2.1 to the peripheral zone 2.2. More precisely, the membrane 2 is single layer and electrically conductive.

Figure 3D:
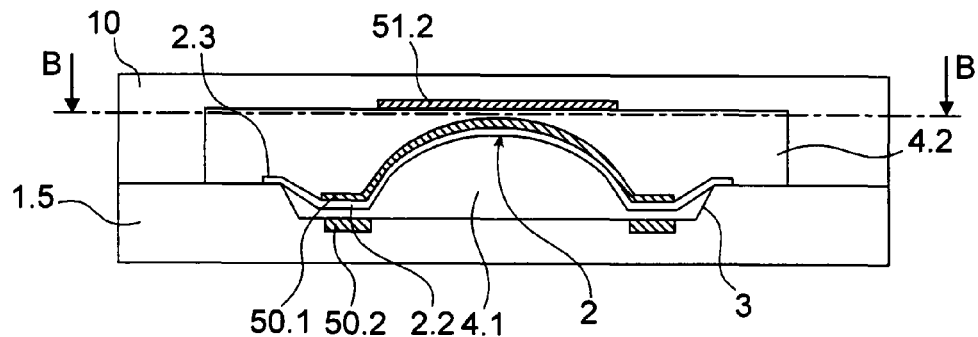

FIG. 3D shows, on the membrane 2, opposite the first fluid 4.1, a mobile electrode 501.1 which acts both as a mobile electrode for the main actuating means 50 and as a mobile electrode for the supplementary actuating means 51. It extends on the central zone 2.1 and is prolonged continuously on the peripheral zone 2.2 but generally does not encroach on the anchoring zone 2.3.

Figure 3E:
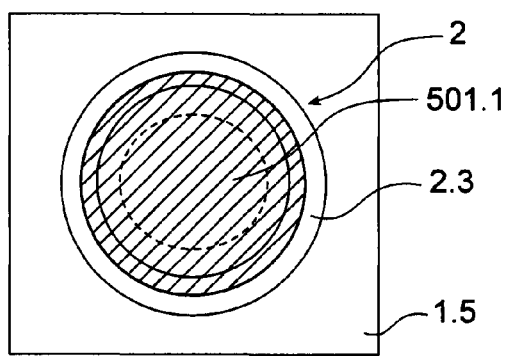

FIG. 3E shows a plan view of such a mobile electrode 501.1 common to the two actuating means 50, 51. The common mobile electrode 501.1 is circular. Finally, the common electrode 501.1 covers the membrane 2 and occupies its central zone 2.1 and its peripheral zone 2.2. The outer ring corresponds to the membrane 2 not covered by the electrode, which substantially corresponds to the anchoring zone 2.3. The next ring internally bounded by the solid line corresponds to a mobile electrode of the main actuating means 50 as shown in FIG. 3B. But in the configuration of FIGS. 3D and 3E, the mobile electrode of the main actuating means 50 is prolonged continuously until it overlaps the central zone 2.1 and acts as a mobile electrode of the supplementary actuating means 51. The dotted circles represent the contour of the fixed electrode 51.2 of the supplementary actuating means 51, the one which is visible at the cover 10 in FIG. 3D. Ultimately, it is the overlap between the two electrodes of each pair of electrodes of the actuating means, whether main or supplementary, that will have an effect on the deformation of the membrane 2. The shifted zone of the membrane 2 depends on the overlapping surface between the two electrodes opposite an actuator, that is their intersection from the mathematical standpoint. Numerous alternatives exist for the choice of this overlapping surface.

Figure 3F:
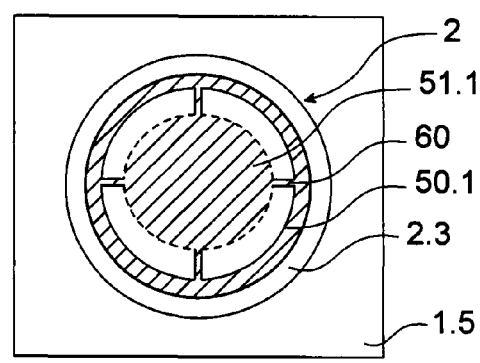

As an alternative in FIG. 3F, the mobile electrode 50.1 of the main actuating means 50 has a ring shape. The mobile electrode 51.1 of the supplementary actuating means 51 is circular and the two mobile electrodes 51.1, 50.1 are electrically connected by at least one conductive extension 60 in the example directed substantially radially. Obviously, a plurality of alternative choices exist for producing an electrical link between the main actuation and the supplementary actuation. The objective is obviously to facilitate the deformation of the membrane 2.

Figure 3G:
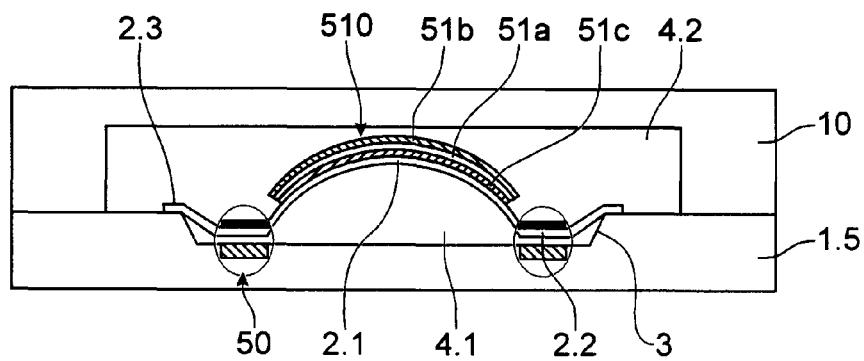

In FIG. 3G, the supplementary actuating means 51 are no longer electrostatic but piezoelectric. In the example shown in this figure, they comprise a piezoelectric actuator 510 with a portion of piezoelectric material 51a sandwiched between two electrodes 51b, 51c.

The piezoelectric actuator is anchored to the membrane 2. In the example, it is located on the face of the membrane 2 located on the side of the cover 10. It could have been anchored to the other face, in contact with the first fluid 4.1 or even embedded in the membrane 2 if it is multilayer. In this example also, the membrane 2 could be provided with one or more locally added sub-layers in order to optimize the action of the supplementary actuating means. The materials used for the supplementary actuating means must be compatible with the optical performance required by the optical device.

In the case of an optical device operating in reflection, they must be transparent in the range of operating wavelengths of the device if they are upstream of the reflecting layer. No condition is required if they are downstream of the reflecting layer.

For an optical device operating in transmission, they must also be transparent.

In the context of the present invention, the term transparent means that they have an optical transmission in agreement with satisfactory operation of the device.

In the examples shown in FIGS. 3A to 3G, the supplementary actuating means 51 comprise a portion located outside the volume of the first fluid 4.1.

We shall now show how to make the main 50 and supplementary 51 actuating means operate. Three operating modes can be distinguished. In the first operating mode, the actuation of the supplementary actuating means 51 may be simultaneous with that of the main actuating means 50. The actuating means 50, 51 are activated at the same time. The deformation of the central zone 2.1 of the membrane 2 is amplified in comparison with the case in which only the main actuating means 50 are activated. The effects of the main actuation and the supplementary actuation are combined from the start of the actuation.

In the second operating mode, it is possible for the supplementary actuating means 51 to be activated only after the main actuating means 50 have started to deform the central zone 2.1 of the membrane 2. They are activated simultaneously and offset, that is only after a period of time, whereas outside this period of time only one of the actuating means is activated. For example, it is conceivable that above a certain deformation threshold of the central zone 2.1 of the membrane 2, the distance between the membrane 2 in the central zone 2.1 and the cover 10, that is the distance between the opposite electrodes of an actuator of the supplementary actuating means 51 becomes sufficiently short for the actuation of the supplementary actuating means 51 to occur and to have a significant effect on the deformation of the central zone 2.1 of the membrane 2. From this threshold, the two actuating means 50, 51 operate together. The advantage of this second operating mode is to trigger the supplementary actuation only when it is efficient and fully participates in the deformation of the central zone 2.1 of the membrane 2. In comparison with the first operating mode, the advantage is to limit the power consumption of the optical device.

In the third operating mode, the supplementary actuating means 51 are only activated when the main actuating means 50 are not activated but have preferably been previously activated. For example, when the central zone 2.1 is in a given position obtained by the main actuating means 50, the supplementary actuation can take over and maintain this position and even continue the deformation whereas the main actuating means 50 are deactivated. The advantage is also to minimize the power consumption insofar as the supplementary actuating means 51 consume less than the main actuating means 50.

It has already been mentioned that the second fluid 4.2 present in the cavity, between the cover 10 and the membrane 2 may be a gas such as air or nitrogen, argon, helium for example, but also a liquid. The first fluid 4.1 and/or the second fluid 4.2, if they are liquid, can be selected from propylene carbonate, water, a refractive index fluid, an optical oil such as silicone oils. If the first fluid is a gas, it may be nitrogen, helium, argon for example. In an optical device operating in transmission, that is of the lens type, it is favourable for the second fluid 4.2 to be a gas such as air, and for the first fluid 4.1 to be a liquid such as water or another liquid with a high absolute refractive index, because a large step index occurs in the diopter, that is the membrane 2. A wide difference exists between the absolute refractive index of air which is 1.000293 and that of water, which is 1.333. This serves to confer a high optical power to the optical device, which is then a liquid which is then a convergent liquid lens operating in transmission.

More generally, when the optical device operates in transmission, the second fluid 4.2 is given an absolute refractive index that is different from that of the first fluid 4.1, this absolute index is lower than that of the first fluid 4.1 when the optical device is convergent and is higher than that of the first fluid 4.1 when the optical device is divergent.

On the contrary, air used as the second fluid 4.2 is not highly favourable for the operation of the supplementary actuating means 51 of the electrostatic type. It would be ideal to have between the two electrodes of a pair of electrodes 51.1, 51.2 of the supplementary actuating means 51, a dielectric medium having the highest possible permittivity. A dielectric liquid with high permeability such as, for example, propylene carbonate, pure water, a refractive index fluid, an optical oil such as silicone oils, would be preferable. However, a step index is lost, because the first fluid 4.1 and the second fluid 4.2, which are both liquids, will have closer absolute refractive indexes. The optical power of the optical device will be weakened. To limit this negative effect, it is preferable to select as the second fluid 4.2 a liquid that has an absolute refractive index lower than that of the first fluid 4.1, which is also liquid.

In conclusion, the greater the difference between the absolute refractive indexes of the first fluid and the second fluid, the higher the optical power of the optical device, all other things remaining equal. From the optical standpoint, the best compromise is to select air as the second fluid 4.2. If the second fluid 4.2 is a liquid, it should have a density as close as possible to that of the first fluid 4.1 in order to limit the effects of gravity on the optical performance of the optical device. This also serves to improve the impact strength. Obviously, this choice of the closest possible densities is not indispensible.

The second fluid 4.2, whether a liquid or a gas, may be free to flow outside the cavity 6 bounded by the cover 10 and the membrane 2. Reference can be made to FIG. 4A. A reservoir 61 containing the second fluid 4.2 communicates via a conduit 62 with the interior of the cavity 6 bounded by the cover 10 and the membrane 2.

The second fluid 4.2 can pass freely from the reservoir 61 to the cavity 6 and vice versa according to the deformation or non-deformation of the membrane 2.

The circulation of the second fluid 4.2 serves to prevent the pressurization of the cavity 6 and the associated risks of releakage, and this increase can be caused, for example, by a rise in the temperature of the optical device.

On the contrary, if the second fluid 4.2, still in the form of a liquid considered to be incompressible, is imprisoned in the cavity 6 bounded by the cover 10 and the membrane 2, another beneficial effect occurs. In fact, during the movement of the central zone 2.1 of the membrane 2 towards the cover 10, the second fluid 4.2 expelled towards the periphery of the membrane 2, causes a shift of the peripheral zone 2.2 of the membrane 2 towards the support 1.5 and therefore amplifies the action of the main actuating means 50 to deform the peripheral zone 2.2 of the membrane 2. Reference can be made to FIG. 4B. In the two FIGS. 4A, 4B, the zebra-striped arrows show the movement of the first fluid 4.1 and of the second fluid 4.2.

The preceding figures showed unitary optical devices comprising a single membrane 2. It is obviously possible for the optical device of the invention to comprise a plurality of membranes 2 to join to the same support 1.5 as shown in FIG. 5A. In this alternative, each membrane 2 is in a cavity 6 specific to it and bounded by a cover 10, all the covers being connected to one another. The membranes 2 may be arranged on the support 1.5 as an array or a matrix for example. In FIG. 5A, only the main actuating means 50 have been shown for the sake of clarity. In such a device, the various membranes 2 may be deformed independently. It should be noted that the optical device in FIG. 5A can be used as such as or subsequently cut into unitary optical devices, each having a single membrane 2. The vertical parallel lines schematically show the sawtooth lines leading to the separation of the optical devices to make them unitary.

FIG. 5A also does not show electrical contacts which must be accessible from the outside for the electric power supply of the actuating means. It is useless to clutter the figures unnecessarily, because the techniques used to make such an optical device in batches are techniques perfectly known to a person skilled in the art of microelectronics and microsystems.

Figure 5B:
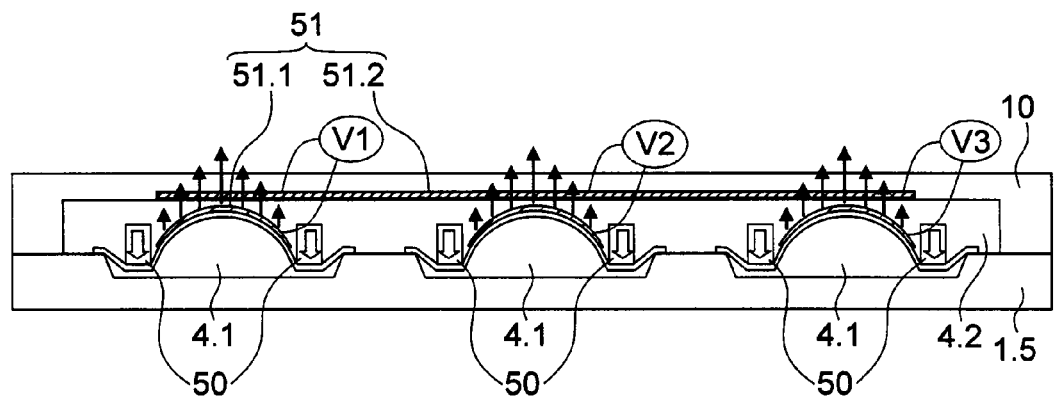

FIG. 5B shows an alternative of the optical device of the invention with a plurality of membranes 2. The membranes 2 are now all placed in the same cavity 6 bounded by a single cover 10. The second fluid 4.2 wets all the membranes 2. On the contrary, each membrane 2 is sealed to the common support 1.5 and imprisons a quantity of first fluid 4.1 specific to it. The supplementary actuating means 51 of the central zone 2.1 of each membrane 2 comprise a specific electrode at each membrane 2 and a single electrode at the cover 10. This single electrode is common to all the supplementary actuating means 51. The membranes 2 may be deformed differently and independently from one another. The supplementary actuating means 51 may be actuated separately as suggested by applying different voltages V1, V2, V3 to the various supplementary actuating means 51. The same applies to the main actuating means 50. It is obvious that all the membranes 2 may be deformed in the same way if the main actuating means 50 on the one hand and the supplementary actuating means 51 on the other hand, associated with each membrane 2, are activated together in the same way.

At the main actuating means 50, means 8 can be provided for servocontrolling the voltage to be applied to the main actuating means 50 according to the thickness d1 of the first fluid present respectively in the membrane 2 at the portion of the peripheral zone 2.2 loaded by the main actuating means 50.

The servocontrol means 8 cooperate with capacitive measurement means 8.1 of the thickness of the first fluid, arranged at several locations of the loaded portion of the peripheral zone 2.2. The measurement means 8.1 may comprise several pairs 7 of electrodes distributed in the loaded portion. It is possible for at least one electrode of a pair 7 of the measurement means 8.1 to be merged with an electrode of the main actuating means 50. In the example in FIG. 6, the fixed electrode 50.2 of the main actuating means 50 is also an electrode of the measurement means 8.1. The other electrode E of a pair 7 of the measurement means 8.1 is located on the membrane 2, on the side of the first fluid 4.1. In an alternative, it is possible for the two electrodes of a pair 7 to be merged with the two electrodes of an actuator of the main actuating means. Yet another configuration would be to dissociate the actuator of the main actuating means 50 and the pair 7 of electrodes of the measurement means 8.1. By applying a potential difference V1' to the two electrodes 50.2, E of each pair 7 of electrodes 50.2, E and by measuring the capacitance on each pair 7 of electrodes 50.2, E, one obtains at each of the pair 7 of electrodes 50.2, E the quantity of first fluid 4.1 present between the electrodes 50.2, E and hence the thickness d1 of the first fluid 4.1 between the membrane 2 and the bottom 3.1 of the bowl 3.

Figure 6:
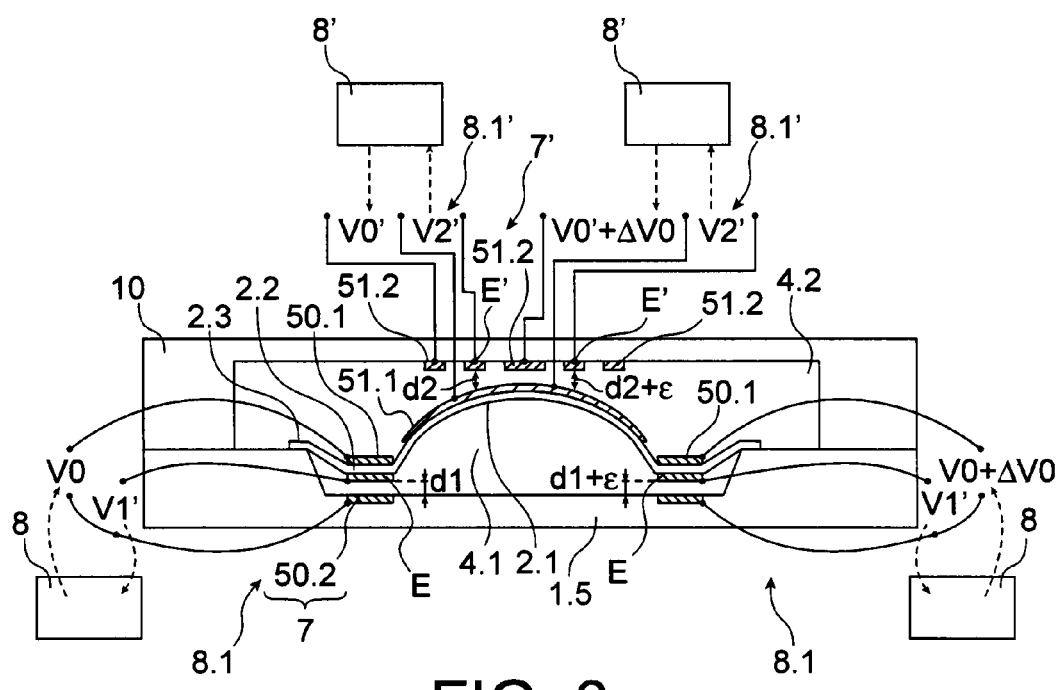
FIG. 6 shows an alternative of an optical device according to the invention equipped with means for servocontrolling the voltage to be applied to the main actuating means and means for servocontrolling the voltage to be applied to the supplementary actuating means.

FIG. 6 merely schematically shows the servocontrol means 8, and they are only shown for two pairs of electrodes 50.2, E and two actuators of the main actuating means 50 to avoid cluttering the figure.

During the operation of the optical device of the invention, if the capacitive measures obtained are different from one place to another, for example d1, d1+∈, the servocontrol means 8 receive the capacitive measurements from the measurement means 8.1, compares them to a reference value which corresponds here to the spacing d1 measured elsewhere, and command an additional correction voltage ΔV0, in addition to the reference voltage V0, to be applied to the corresponding actuators of the main actuating means 50, at the places where the capacitive measurement differs from the reference value. All the capacitive measurements are thereby standardized to the reference value and therefore all the distances between the membrane 2 and the bottom 3.1 of the bowl 3, by adjusting the power supply voltages of the actuators of the main actuating means 50.

The parallelism necessary for the satisfactory operation the lens or the mirror is thereby guaranteed by a movement servocontrol. This servocontrol does not pose any problem for a person skilled in the art.

In order to vary the focal length of the optical device, a voltage V0 is applied to all the actuators of the main actuating means 50 as shown in FIG. 6, the measurement means 8.1 are used to measure the space d1 between the membrane 2 and the bottom 3.1 of the bowl 3, and the measurements are delivered to the servocontrol means 8. If one or more pairs 7 of electrodes 50.2, E detects an undesirable offset E, the servocontrol means 8 command the application of an additional correction voltage ΔV0 to one or more actuators of the main actuating means 50 closest to the pairs 7 of electrodes having detected the undesirable offset ∈. The additional correction power supply voltage ΔV0 applied to one or more actuators of the main actuating means 50 causes them to move the membrane 2 locally so that the offset is cancelled.

It is obviously possible, similarly, to provide means 8' for servocontrol in the voltage V0' to be applied to the supplementary actuating means 51 according to the thickness d2 of the second fluid present respectively between the membrane 2 and the cover 10 in the portion of the central zone 2.1 loaded by the supplementary actuating means 51. The servocontrol means 8' cooperate with means 8.1' for capacitive measurement of the thickness of the second fluid 4.2, placed at several locations in the loaded portion of the central zone 2.1. The measurement means 8.1' may comprise a plurality of pairs 7' of electrodes 51.1, E', distributed in the loaded portion. It is assumed that one of the two electrodes 51.1 of a pair is merged with one electrode of an actuator of the supplementary actuating means 51. In the example, this is the mobile electrode 51.1 present on the membrane 2. The other electrode E' of a pair 7' is positioned opposite and carried by the cover 10. The voltage to be applied to the capacitive measurement means 8.1' is called V2' and the additional correction voltage ΔV0' is added to the voltage V0' applied to the supplementary actuating means insofar as a thickness d2+∈' of the second fluid 4.2 is measured.

Figure 7A:
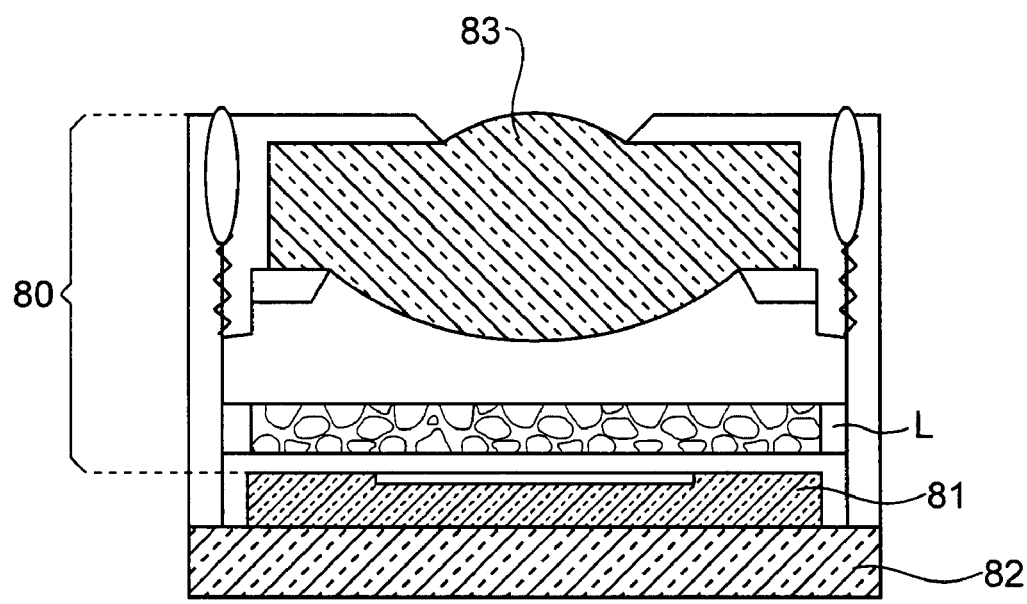
FIGS. 7A, 7B show two viewing devices employing at least one optical device of the invention.

Such a variable focal length optical device can be employed in a viewing device, in particular that of a mobile telephone camera. Reference can be made to FIG. 7A. Such a viewing device comprises, in a cascade, a lens 80 including at least one variable focal length optical device L according to the invention of the liquid lens type for example, an image sensor 81 for example of the CCD or CMOS type carried by a substrate 82. In the example described, the lens 80 comprises at least one fixed focal length lens 83 and one liquid lens L according to the invention. In the following discussion, this fixed focal length lens 83 is called conventional optical block. The liquid lens L is present between the conventional optical block 83 and the image sensor 81. In an alternative, the conventional optical block 83 may be located between the liquid lens L and the image sensor 81. The conventional optical block 83 is static. As shown above, by virtue of its method of manufacture, the liquid lens L can be treated as a MOEMS (micro optoelectromechanical system). The variable focal length liquid lens L is placed at a certain distance, which depends on the characteristics of the lens 80, from the image sensor 81, but even if this distance is short, the liquid lens L and the image sensor 81 can only make a single component by integrating them either in AIC (Above Integrated Circuit) technology, or WLCSP (Wafer Level Chip Scale Package) technology. The focal length of the liquid lens L is adjusted by optimizing the pressure of the liquid at rest, and also the curvature of the membrane at rest and the refractive index of the liquid.

Figure 7B:
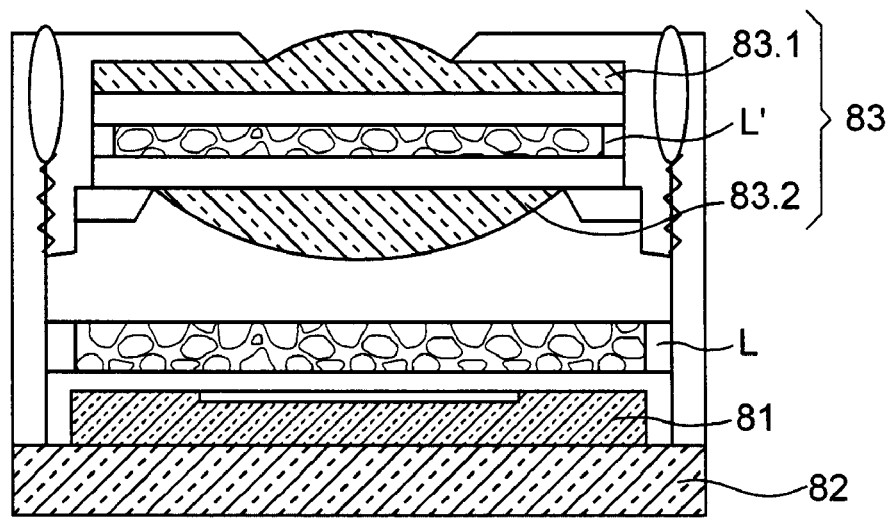
Figure 8A:
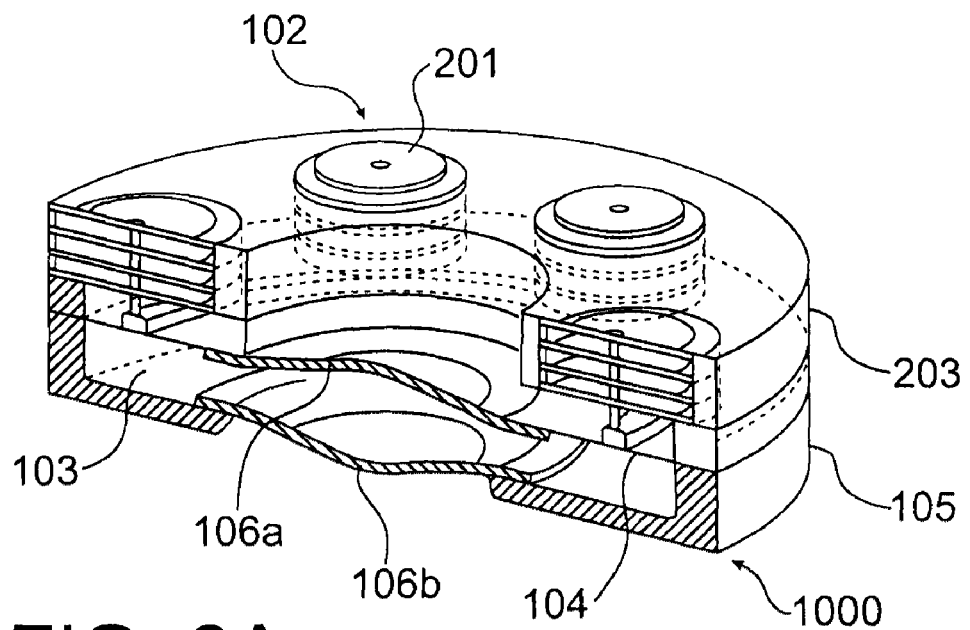
FIGS. 8A, 8B, already described, show conventional liquid lenses.
Figure 8B:
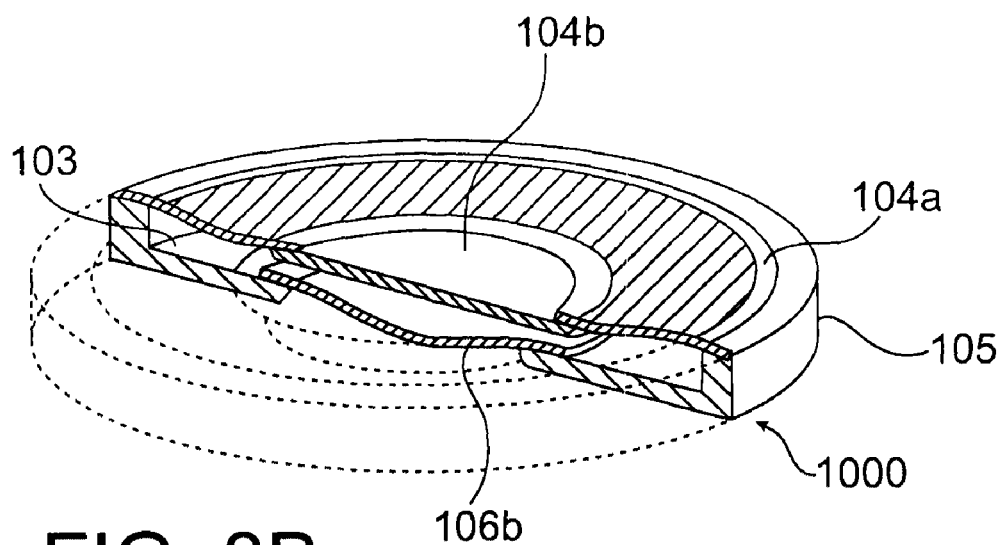

If the viewing device also includes the zoom function as in FIG. 7B, an optical block 83 is used with at least two fixed focal length lenses 83.1, 83.2 and two liquid lenses L and L' of which one is positioned between the two lenses 83.1, 83.2 of the optical block 83 and other close to the image sensor 81 as shown in FIG. 7B.

In the FIGS. 7A, 7B, the optical device of the invention L, L' has been integrated with an optical component such as a viewing device. It has been placed downstream of the optical block 83 (FIGS. 7A, 7B) or has been placed in the optical block 83 (FIG. 7B). It is obviously possible to place it upstream of the optical block. However, this alternative has not been illustrated to avoid needlessly increasing the number of figures.

Although several embodiments of the present invention have been shown and described in detail, it can be understood that various changes and modifications can be made while remaining within the scope of the invention. It is possible in particular to change the type of actuating means, whether they are the main or supplementary actuating means.

The invention claimed is:

1. An optical device comprising:
at least one deformable membrane;
a first support; and
actuating means for loading the membrane to deform it, the membrane being provided with a anchoring zone for anchoring to the support which surrounds a part of the membrane including a substantially central zone that is reversibly deformable, the support and the membrane contributing to imprison a constant volume of a first fluid in contact with a face of part of the membrane,
wherein the actuating means comprises control-activated main actuating means for loading the membrane in a peripheral zone lying between the central zone and the anchoring zone in order to move the peripheral zone of the membrane in a first direction and to move the first fluid towards the central zone and control-activated supplementary actuating means anchored at least to the membrane for loading the membrane in the central zone to move the central zone of the membrane in a second direction, opposite to the first direction.

2. The optical device according to claim 1, further comprising a cover opposite the membrane.

3. The optical device according to claim 1, in which the main actuating means are formed from at least one electrostatic, piezoelectric, thermal bimorph, or magnetic actuator.

4. The optical device according to claim 3, in which, when the main actuating means comprise at least one electrostatic actuator, the at least one electrostatic actuator comprises two electrodes facing one another separated by a dielectric with a fixed electrode at the first support and a mobile electrode at the membrane.

5. The optical device according to claim 1, comprising a second support fixed to the first support, in which the supplementary actuating means comprise at least one electrostatic actuator formed from two electrodes facing one another separated by a dielectric with a mobile electrode at the membrane and a fixed electrode at the second support.

6. The optical device according to claim 5, in which, the supplementary actuating means comprise a plurality of electrostatic actuators, and the fixed electrodes and/or the mobile electrodes of the actuators are arranged concentrically about an optical axis of the optical device.

7. The optical device according to claim 3, in which the main actuating means and the supplementary actuating means comprise at least a fixed electrode and/or a mobile electrode, the fixed electrode or the mobile electrode being common to a plurality of actuators belonging to the main actuating means and/or to the supplementary actuating means.

8. The optical device according to claim 3, in which the main actuating means and/or the supplementary actuating means comprise a mobile electrode, the mobile electrode of the main actuating means and/or of the supplementary actuating means being located on one of the faces of the membrane, being sandwiched between two sub-layers of the membrane or being formed by the membrane itself.

9. The optical device according to claim 3, in which the main actuating means and the supplementary actuating means comprise a mobile electrode, the mobile electrode of the main actuating means and a mobile electrode of the supplementary actuating means being merged.

10. The optical device according to claim 3, in which the main actuating means and the supplementary actuating means comprise a mobile electrode, the mobile electrode of the main actuating means and the mobile electrode of the supplementary actuating means being electrically connected by at least one electrically conductive extension.

11. The optical device according to claim 2, in which the cover bounds a cavity filled with a second fluid.

12. The optical device according to claim 1, in which the supplementary actuating means are piezoelectric.

13. The optical device according to claim 1, in which the supplementary actuating means comprise a portion located outside the volume of the first fluid.

14. The optical device according to claim 11, further comprising:
means for servocontrolling a voltage to be applied to the main actuating means according to a thickness of the first fluid in a vicinity of the main actuating means, and/or
means for servocontrolling a voltage to be applied to the supplementary actuating means according to a thickness of the second fluid in a vicinity of the supplementary actuating means.

15. The optical device according to claim 2, further comprising a plurality of membranes, in which the cover protects the plurality of membranes.

16. The optical device according to claim 15, in which the cover carries a fixed electrode common to a plurality of the supplementary actuating means each loading a different membrane.

17. A viewing device comprising at least one optical device according to claim 1.

18. An optical device comprising:
at least one deformable membrane;
a first support; and
actuating unit that applies a load to the membrane to deform it, the membrane being provided with a anchoring zone for anchoring to the support which surrounds a part of the membrane including a substantially central zone that is reversibly deformable, the support and the membrane contributing to imprison a constant volume of a first fluid in contact with a face of part of the membrane,
wherein the actuating unit comprises a control-activated main actuating unit that applies a load to the membrane in a peripheral zone lying between the central zone and the anchoring zone in order to move the peripheral zone of the membrane in a first direction and to move the first fluid towards the central zone and a control-activated supplementary actuating unit anchored at least to the membrane that applies a load to the membrane in the central zone to move the central zone of the membrane in a second direction, opposite to the first direction.

* * * * *